L. C. VANDERLIP.
AUTOMOBILE STEERING WHEEL LOCK.
APPLICATION FILED SEPT. 1, 1917.
1,330,414. Patented Feb. 10, 1920.
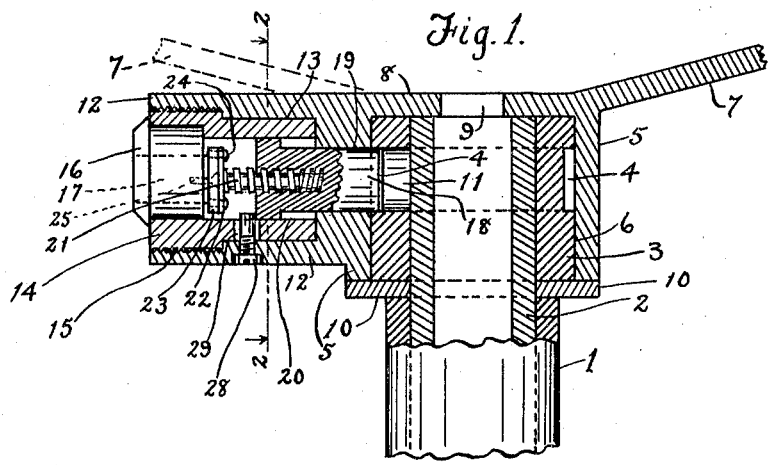
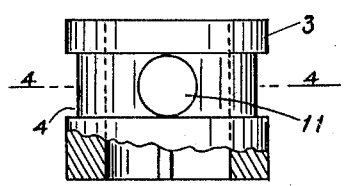
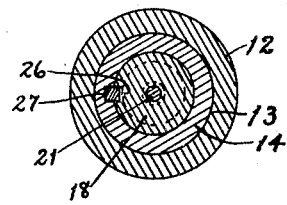
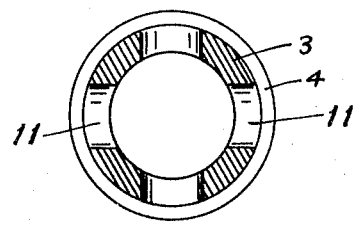
INVENTOR
Louis C. Vanderlip.

UNITED STATES PATENT OFFICE.

LOUIS C. VANDERLIP, OF ELKHART, INDIANA.

AUTOMOBILE-STEERING-WHEEL LOCK.

1,330,414.  Specification of Letters Patent.  Patented Feb. 10, 1920.

Application filed September 1, 1917. Serial No. 189,250.

*To all whom it may concern:*

Be it known that I, LOUIS C. VANDERLIP, a citizen of the United States, residing in the city of Elkhart, Elkhart county, Indiana, have invented certain new and useful Improvements in Automobile-Steering-Wheel Locks, of which the following is a specification.

This invention relates to locking means carried by the steering wheel whereby the automobile steering gear is rendered inoperative to all but authorized persons.

An object of my invention is the production of a device of the class described in which the steering gear of the motor car is rendered inoperative by the steering wheel, but which does not prevent the towing or pushing of the car and the guiding thereof in emergency cases.

Another object of my invention is the production of a device of the kind described for rendering the top end of the steering post of the steering gear inaccessible to unauthorized persons. Other objects of my invention are mentioned and described in the following specification.

The preferred embodiment of my invention is well illustrated in the accompanying drawings in which Figure 1 is a view in elevation and partly in section in which the members of the device are shown positioned to enable the free rotation of the steering wheel, in which position the steering gear of the car is inoperative by the steering wheel; Fig. 2 is a section taken on the line 2—2 of Fig. 1; Fig. 3 is a view partly in section of a side elevation of the driver sleeve; and Fig. 4 is a section taken on the line 4—4 of Fig. 3 showing a driver sleeve having a plurality of bolt sockets.

The drawings disclose numeral 1 to be the top end of the conventional steering column within which is mounted the conventional and revoluble steering post 2. The numeral 3 indicates a cylindrical driver sleeve member encompassing the top end of the steering post 2 and rigidly fastened thereto by a key or any other suitable means, not shown, the outer periphery of said sleeve being provided with an endless circumferential groove 4 formed therein intermediate the sleeve extremities.

The numeral 5 indicates a steering wheel hub provided with a cylindrical bore 6 within which bore the sleeve 3 is arranged, said hub member having the usual steering wheel spider arms 7, 7, and a head 8, the latter being apertured at 9 to permit the passage of the conventional control connections from the interior of the post 2. If the conventional control connections are disposed exteriorly of the steering post 2 the aperture 9 in the hub head 8 is omitted, thereby completely incasing the top end of the steering post 2 and the sleeve 3.

The numeral 10 indicates a plate or washer carried upon the post 2 beneath the sleeve 3 and the hub 5, whereby the lower end of said sleeve is concealed and rendered inaccessible to unauthorized persons. The numeral 11 indicates a radially arranged bolt socket formed in the sleeve 3 in communication with the groove 4, said socket being adapted to receive a movable locking bolt, hereinafter described, for rigidly connecting the wheel hub 5 and said sleeve for rotating the latter and thereby the steering post 2. Numeral 12 indicates a lock housing projecting laterally from the hub 5 and provided with the bore 13 within which bore a tubular sleeve member 14 is removably arranged being screw threaded therein at 15. Numeral 16 indicates a pin or disk tumbler lock cylinder of any suitable type in which the key barrel 17 is continuously revoluble.

The numeral 18 indicates a steering wheel locking bolt slidably arranged partially within a guide opening 19 formed in the thickened wall of the hub 5 and partially within the bore 20 of the sleeve member 14, said opening 19 being adapted to be placed in registration with the bolt socket 11 by rotation of said wheel hub, whereby said bolt may be projected into said bolt socket. Numeral 21 indicates a nonadvancing screw member suitably and operatively threaded into and longitudinally of the bolt 18, said screw being provided with a head 22 which is rigidly fastened to a key barrel head 23 by the screws 24, said head 23 being rigidly fastened to the inner end of the key barrel 17 by a screw 25.

The numeral 26 indicates a groove formed in the outer periphery of one end of the bolt 18 (see Fig. 2) and longitudinally thereof, which groove is disposed in slidable engagement with a tongue member 27, the latter being rigidly fastened in the wall of the sleeve bore 13, whereby rotation of the bolt 18 is prevented when the screw 21 is rotated by the rotation of the key barrel 17. The numeral 28 indicates a stop screw threaded into the housing 12 and projecting through the sleeve aperture 29 somewhat, said stop screw being adapted to be engaged by the end of the bolt 18 for limiting the retraction movement thereof.

It is evident that the bolt 18 is moved back and forth when the key barrel of the lock cylinder 16 is rotated by the manipulation of the key thereof alternately in opposite directions. It is evident also, when the bolt 18 is thus projected into the socket 11, that the steering post 2 may be rotated, whereby the steering gear of the car is operated.

It is evident also, when the bolt 18 is retracted (as indicated in Fig. 1) that the steering wheel is freely revoluble upon the driver sleeve 3, the point of said bolt engaging the groove 4 only of said sleeve and traveling therein when the steering wheel is rotated, in which position of said bolt point the upper wall of said groove serves as an abutment engageable by the bolt if an effort is made to remove the steering wheel from the sleeve 3, thereby preventing unauthorized access to either the sleeve 3 or the steering post 2.

The removal of the stop screw 28 enables an authorized person, by rotation of the key barrel 17, to effect the maximum retraction of the bolt 18 whereby the point thereof is withdrawn from the groove 4, thereby enabling the removal of the steering wheel from the sleeve 3. In mounting my improved steering wheel and lock upon the sleeve 3 the stop screw 28 is removed, or retracted, to enable full retraction of the bolt 18, whereupon the wheel hub 5 is readily mounted upon said sleeve, in which position the point of the bolt 18 is in registration with the sleeve groove 4 and may readily and quickly be projected therein by the rotation of the key barrel 17. Thereafter, when the stop screw 28 is again operative as a stop member for the bolt 18 the latter can not then inadvertently be retracted by the operator out of the groove 4. In Fig. 4 the sleeve 3 is shown having a plurality of bolt sockets 11 positioned around the sleeve at intervals, any one of which sockets may be engaged by the point of the bolt 18 for locking purposes, as described.

I claim:

1. In steering wheel locking means, a driver member operatively connected with the steering gear, said driver member being provided with a locking bolt socket and an abutment above said socket; a steering member carried by said driver member; a reciprocatory locking bolt carried by the steering member; a revoluble key controlled cylinder carried by the steering member; and a revoluble device operatively connecting said locking bolt and said revoluble cylinder, whereby, when the latter is rotated in opposite directions, said locking bolt is engaged or disengaged with said bolt socket, being engaged by said abutment when disengaged with said socket, and whereby, when additional rotation of said revoluble cylinder is effected, clearance between said abutment and said locking bolt is effected, thereby enabling the removal of said steering member from said driver member.

2. In steering wheel locking means, a driver member operatively connected with the steering gear, said driver member being provided with a locking bolt socket and an abutment adjacent said socket; a steering member carried by said driver member; a reciprocatory locking bolt carried by said steering member and adapted for alternate engagement and disengagement with said driver member socket, whereby said driver and steering members are placed in operative or inoperative relation; a movable stop member adapted to limit the retractive movement of said locking bolt; and means for effecting an additional retractive reciprocatory movement of said locking bolt after movement of said stop member, whereby it is caused to clear said driver abutment, thereby enabling the removal of said steering member from said driver member.

3. In steering wheel locking means, a driver member operatively connected with the steering gear of a vehicle, said driver member being provided with a locking bolt socket and an abutment portion above said bolt socket; a steering wheel provided with a hub which is carried by said driver member; a movable locking bolt carried by the steering wheel and adapted to be moved into engagement with said driver socket, whereby said steering wheel is locked against independent rotation, said bolt being adapted also for retraction from said socket, whereby independent rotation of the steering wheel may be effected, and whereby said bolt engages beneath said driver abutment, thereby preventing removal of the steering wheel from said driver member; a movable stop member adapted to limit the retracted movement of said bolt to a position beneath said abutment; and means for moving said stop member, whereby said bolt may be retracted from beneath said abutment, thereby enabling the removal of the steering wheel from said driver member.

In testimony whereof I have hereunto affixed my signature this 29th day of August, 1917.

LOUIS C. VANDERLIP.